United States Patent
Hashizume

(10) Patent No.: US 11,782,069 B2
(45) Date of Patent: Oct. 10, 2023

(54) OBJECT DETECTION DEVICE

(71) Applicant: HONDA MOTOR CO., LTD., Tokyo (JP)

(72) Inventor: Takashi Hashizume, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/840,669

(22) Filed: Jun. 15, 2022

(65) Prior Publication Data

US 2022/0404387 A1 Dec. 22, 2022

(30) Foreign Application Priority Data

Jun. 21, 2021 (JP) .................................. 2021-102612

(51) Int. Cl.
*G01P 15/02* (2013.01)
*G01P 15/14* (2013.01)
*G01V 11/00* (2006.01)

(52) U.S. Cl.
CPC .............. *G01P 15/02* (2013.01); *G01P 15/14* (2013.01); *G01V 11/00* (2013.01)

(58) Field of Classification Search
CPC ......... G01P 15/02; G01P 15/14; G01V 11/00; G01V 3/12; G01C 21/165; B63C 9/0005; G01S 15/93; G01S 17/93; G01S 13/937; G05D 1/0206
See application file for complete search history.

(56) References Cited

U.S. PATENT DOCUMENTS

| | | | |
|---|---|---|---|
| 2010/0092042 A1* | 4/2010 | Asari | B60R 1/00 382/106 |
| 2014/0030938 A1* | 1/2014 | Kamio | B63H 11/113 440/1 |
| 2020/0216152 A1* | 7/2020 | Mizuno | G01S 13/862 |
| 2020/0250992 A1* | 8/2020 | Derginer | B63H 25/04 |

FOREIGN PATENT DOCUMENTS

JP 2020-019372 2/2020

* cited by examiner

*Primary Examiner* — Xin Y Zhong
(74) *Attorney, Agent, or Firm* — AMIN, TUROCY & WATSON, LLP

(57) ABSTRACT

An object detection device includes an external sensor, an inertia sensor, and a control device. The external sensor is fixed to a ship. The external sensor detects an object. The inertia sensor detects information related to an inertial force applied to the ship. The control device acquires a state of relative displacement of a detection object on the basis of a signal output from the external sensor. The control device acquires a state of an attitude change of the ship on the basis of a signal output from the inertia sensor. The control device determines whether a detection object is present outside the ship according to a correlation between the state of the attitude change of the ship and the state of the relative displacement of the detection object.

2 Claims, 3 Drawing Sheets

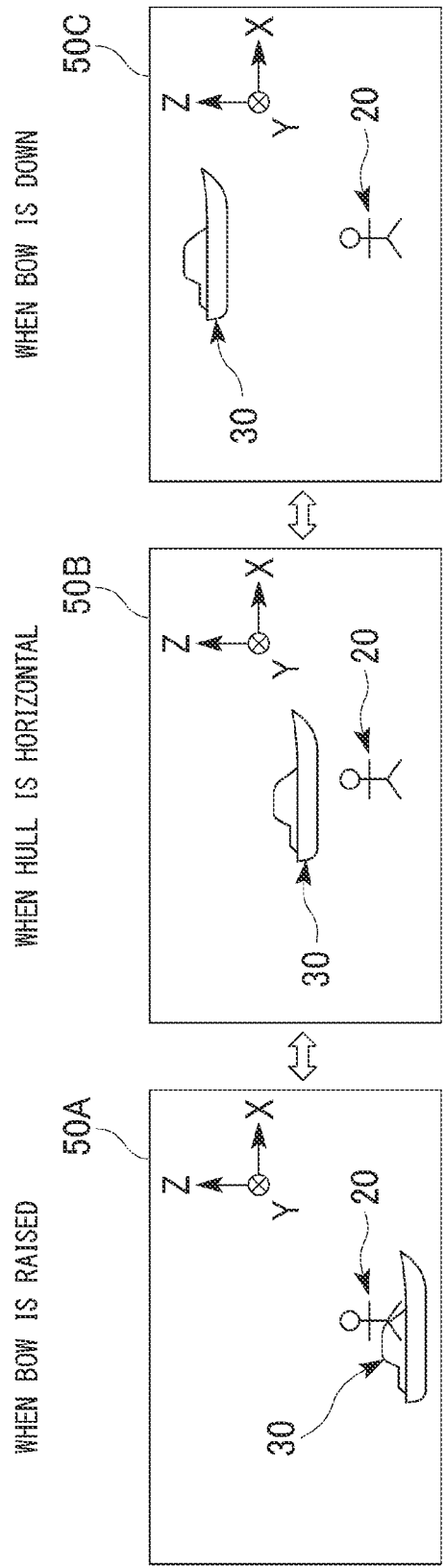

OBJECT DETECTION DEVICE

CROSS-REFERENCE TO RELATED APPLICATION

Priority is claimed on Japanese Patent Application No. 2021-102612, filed Jun. 21, 2021, the content of which is incorporated herein by reference.

BACKGROUND OF THE INVENTION

Field of the Invention

The present invention relates to an object detection device.

Description of Related Art

In the related art, for example, a device configured to detect an object present around a ship using a plurality of sonar sensors disposed on the periphery of the ship is known (for example, see Japanese Unexamined Patent Application, First Publication No. 2020-19372).

SUMMARY OF THE INVENTION

Incidentally, in a device like that disclosed in the related art, a plurality of sensors disposed on the periphery of the hull may be exposed to water, making a proper detecting operation difficult. In addition, in the periphery of the hull, for example, the sensors disposed in an area in which various operations are performed, such as a bow, a stern, or the like, may be prone to occur abnormalities due to damage or the like.

For such problems, for example, by disposing the sensors in a structure above the hull such as a bridge, a cabin, or the like, it is possible to promote normal operations of the sensors and minimize occurrence of abnormalities due to damages or the like of the sensors. However, when the sensors disposed in the central portion above the hull detect the exterior on the water or the like, an object on the ship such as a crew, equipment, or the like may be erroneously detected as an object outside the ship.

An aspect of the present invention provides an object detection device capable of properly detecting an object outside a ship.

(1) An object detection device (for example, an object detection device (10) according to the embodiment) according to an aspect of the present invention includes an inertia sensor (for example, an inertia sensor (13) according to the embodiment) configured to detect an inertial force applied to a ship (for example, a ship (1) according to the embodiment) and output a signal of a detection value of information related to the inertial force; an object sensor (for example, an external sensor (11) according to the embodiment) fixed to the ship and configured to detect an object (for example, a first detection object (20) and a second detection object (30) according to the embodiment) and output a signal of a detection value of information related to the object; and a processing device (for example, a control device (15) according to the embodiment) configured to acquire a state of an attitude change of the ship on the basis of the signal output from the inertia sensor, acquire a state of relative displacement of the object on the basis of the signal output from the object sensor, and determine whether the object is present outside the ship according to a correlation between the state of the attitude change of the ship and the state of the relative displacement of the object.

(2) In the object detection device according to the aspect of the above-mentioned (1), the processing device may determine that the object is present outside the ship when the correlation is greater than a predetermined level.

According to the aspect of the above-mentioned (1), it is possible to appropriately discriminate the object mounted on the ship and the object outside the ship by providing the processing device configured to determine whether the object is present outside the ship according to the correlation between the state of the relative displacement of the detected object and the state of the attitude change of the ship.

In the case of the aspect of the above-mentioned (2), it is possible to accurately detect the object outside the ship more appropriately by providing the processing device configured to determine that the object is present outside the ship when the correlation between the state of the relative displacement of the detected object and the state of the attitude change of the ship is greater than a predetermined level.

BRIEF DESCRIPTION OF THE DRAWINGS

FIG. 3 is a view showing an example of a state of shaking of the ship on which the object detection device according to the embodiment of the present invention is mounted and a state of displacement of an object detected by an external sensor.

DETAILED DESCRIPTION OF THE INVENTION

Hereinafter, an object detection device 10 according to an embodiment of the present invention will be described with reference to the accompanying drawings.

Figure 1:
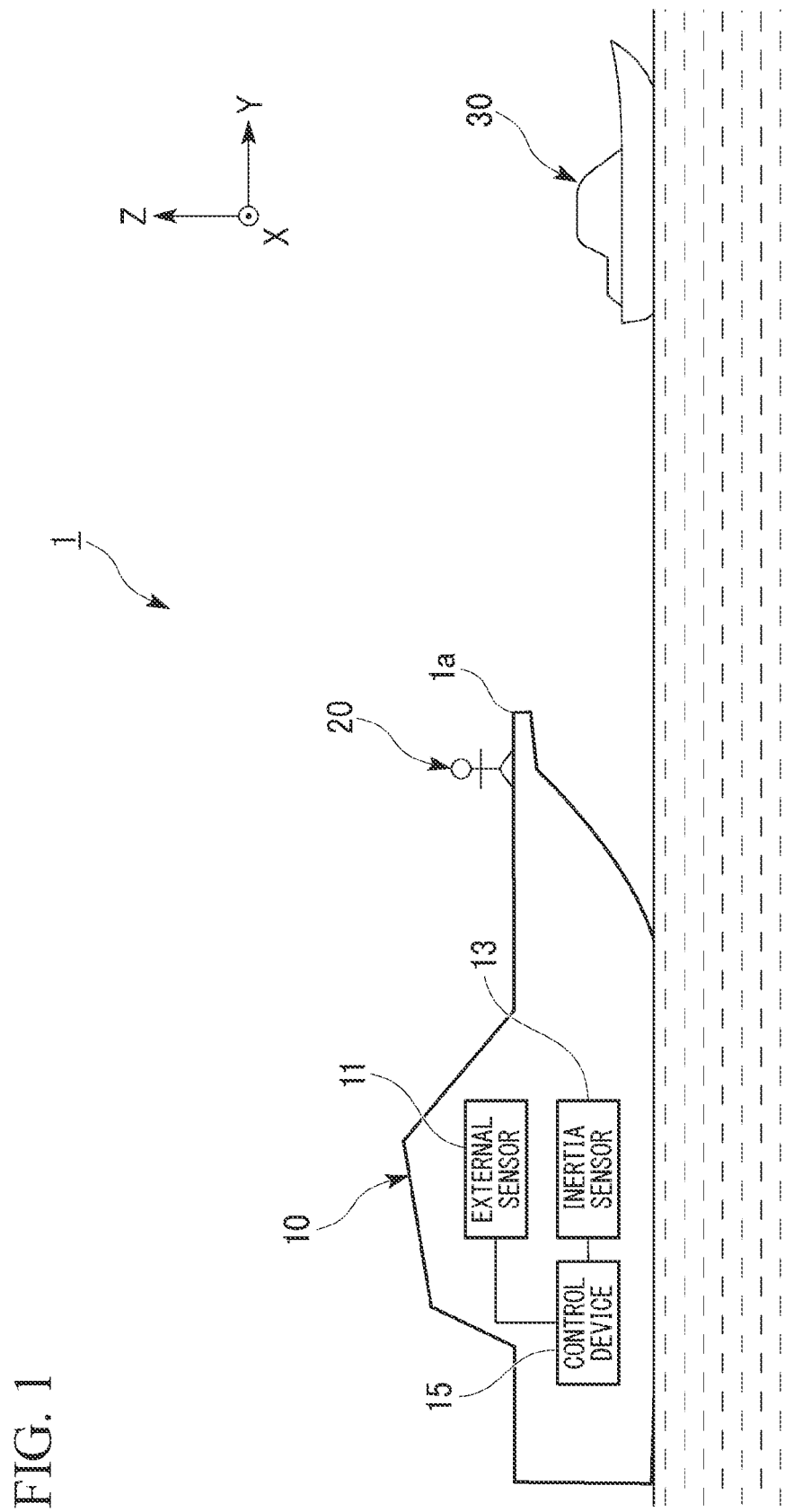
FIG. 1 is a configuration view of a ship on which an object detection device according to an embodiment of the present invention is mounted.

FIG. 1 is a configuration view of a ship 1 on which the object detection device 10 according to the embodiment is mounted.

In the following, axial directions of an X axis, a Y axis and a Z axis, which are perpendicular to each other in a 3-dimensional space, are directions parallel to each of the axes. For example, as shown in FIG. 1, the Z-axis direction is parallel to a vertical direction, and the X-axis direction and the Y-axis direction are parallel to horizontal directions. The X-axis direction is parallel to a leftward/rightward direction of the ship 1, for example, when an upward/downward direction of the ship 1 is parallel to the Z-axis direction. The Y-axis direction is parallel to a forward/rearward direction of the ship 1, for example, when the upward/downward direction of the ship 1 is parallel to the Z-axis direction.

As shown in FIG. 1, the object detection device 10 according to the embodiment is mounted on the ship 1.

The object detection device 10 includes, for example, an external sensor 11, an inertia sensor 13, and a control device (processing device) 15.

The external sensor 11 includes at least one of, for example, sonar, a radar device, a finder, a camera, and the like.

Each of the sonar, the radar device and the finder detects a distance to the object, a position, or the like by radiating each of ultrasonic waves, electromagnetic waves and light to surroundings of the ship 1 and detecting reflection or diffusion by the object. Further, the finder is, for example, light detection and ranging or laser imaging detection and ranging (LIDAR).

The camera is, for example, a digital camera including a solid-state image sensing device such as a charge coupled device (CCD), a complementary metal oxide semiconductor (CMOS), or the like. The camera outputs image data obtained by imaging the outside of the ship 1 in a visible light region and an infrared light region.

The external sensor 11 is disposed on, for example, a structure on the upper part of the hull of the ship 1 such as a bridge, a cabin, or the like. The external sensor 11 is configured to change displacement or attitude in conjunction with the attitude change of the ship 1, and is fixed such that, for example, the relative position and attitude with respect to the ship 1 are not changed.

A detection range of the external sensor 11 is, for example, a predetermined range of the ship 1, which includes at least a predetermined range in front of the ship 1.

The inertia sensor 13 includes at least one of, for example, a gyro sensor, an acceleration sensor, and the like. The inertia sensor 13 detects an inertial force applied to the ship 1 and outputs a signal of a detection value of information related to the inertial force (for example, an angular velocity, an acceleration, or the like).

The control device 15 generally controls, for example, the ship 1 as a whole. The control device 15 is, for example, a software function part that functions when a predetermined program is executed by a processor such as a central processing unit (CPU) or the like. The software function part is an electronic control unit (ECU) including a processor such as a CPU or the like, a read only memory (ROM) in which a program is stored, a random access memory (RAM) in which data is temporarily stored, and an electronic circuit such as a timer or the like. Further, at least a part of the control device 15 may be an integrated circuit such as large scale integration (LSI) or the like.

The control device 15 acquires a state of a relative displacement of the object with respect to the ship 1 according to a predetermined calculation, map reference, or the like based on the signal output from the external sensor 11. For example, the control device 15 acquires a relative position of the object with respect to the ship 1 in a predetermined detection region of the external sensor 11 based on the signal output from the sonar, the radar device, the finder, or the like of the external sensor 11. For example, the control device 15 acquires a relative position of the object with respect to the ship 1 in the predetermined detection region of the external sensor 11 through predetermined recognition processing on image data output from the camera of the external sensor 11. The control device 15 acquires a state of displacement of the object based on the information of the position of the object throughout an appropriate period.

The control device 15 acquires a state of the attitude change of the ship 1 according to the predetermined calculation, map reference, or the like based on the signal output from the inertia sensor 13. The control device 15 acquires a state of the attitude change such as a state of shaking of the ship 1 or the like based on the information of the attitude of the ship 1 throughout the appropriate period.

The control device 15 determines whether the object detected by the external sensor 11 is present on an outer side of the ship 1 (outside the ship 1) according to a correlation between the state of the displacement of the object found on the basis of the signal output from the external sensor 11 and the state of the attitude change of the ship 1 found on the basis of the signal output from the inertia sensor 13. The control device 15 determines that the object is present outside the ship 1, for example, when the correlation between the state of the displacement of the detected object and the state of the attitude change of the ship 1 is greater than a predetermined level.

Hereinafter, an operation example of the object detection device 10 of the embodiment will be described.

Figure 2:
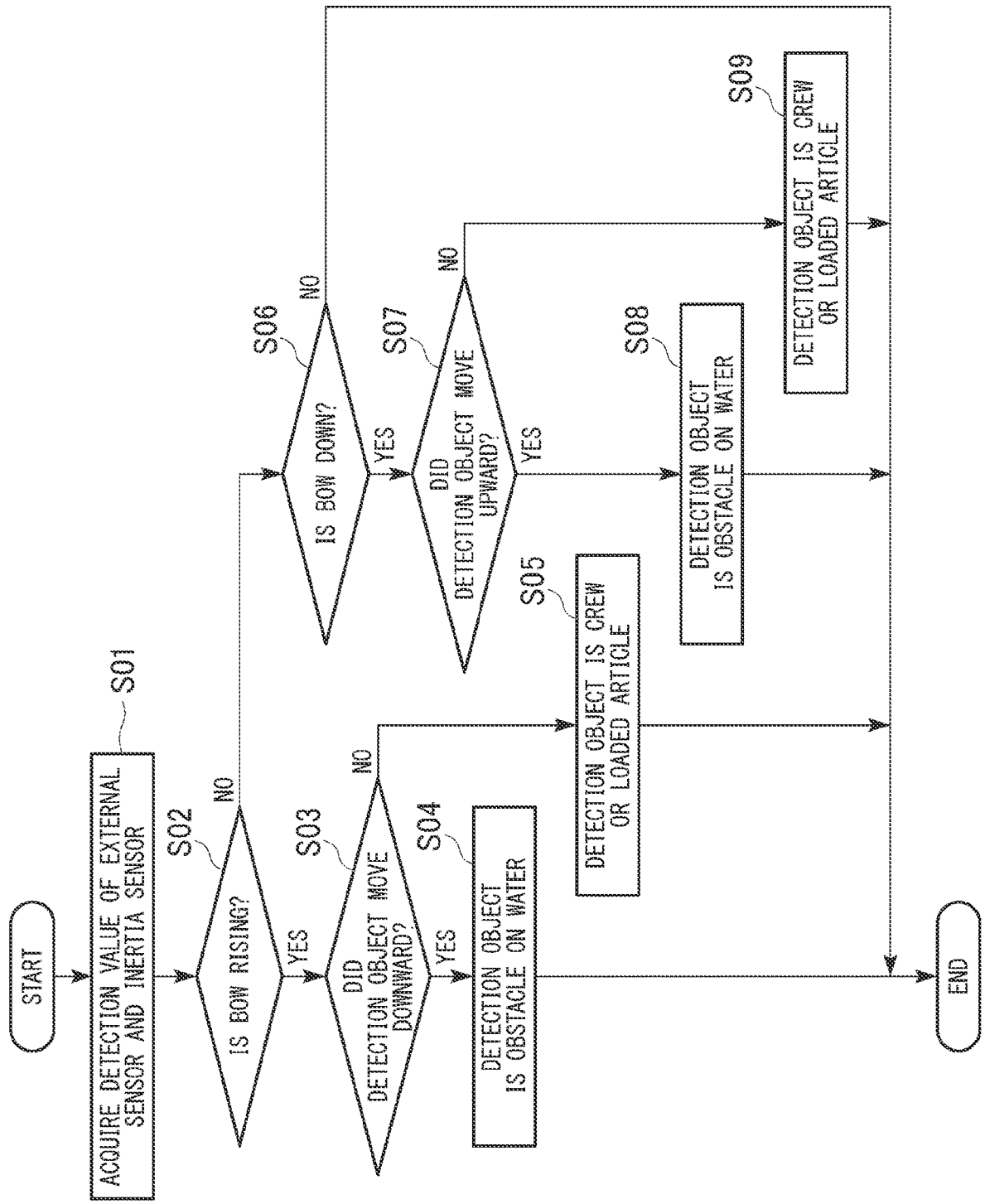
FIG. 2 is a flowchart showing an operation of an object detection device according to the embodiment of the present invention.

FIG. 2 is a flowchart showing an operation of the object detection device 10 according to the embodiment. FIG. 3 is a view showing an example of a state of shaking of the ship 1 on which the object detection device 10 according to the embodiment is mounted and a state of displacement of the object detected by the external sensor 11.

Processing shown in FIG. 2 is repeatedly executed in, for example, a predetermined period.

First, in step S01 shown in FIG. 2, the control device 15 acquires a signal output from each of the external sensor 11 and the inertia sensor 13.

Next, in step S02, the control device 15 acquires the state of the attitude change of the ship 1 on the basis of the signal received from the inertia sensor 13, and determines whether a bow 1a of the ship 1 is in a bow-rising state in which the bow is displaced upward due to, for example, pitching or the like.

When the determination result is "YES," the control device 15 advances the processing to step S03. Meanwhile, when the determination result is "NO," the control device 15 advances the processing to step S06.

Next, in step S03, the control device 15 acquires the state of the displacement of the object (detection object) detected on the basis of the signal received from the external sensor 11, and determines whether the detection object in the predetermined detection region of the external sensor 11 is displaced downward relative to the ship 1, for example, due to pitching of the ship 1.

When the determination result is "YES," the control device 15 advances the processing to step S04. Meanwhile, when the determination result is "NO," the control device 15 advances the processing to step S05.

Next, in step S04, the control device 15 determines that the detection object is an object present outside the ship 1, for example, an object such as an obstacle (obstacle on water) or the like floating on a water surface. Then, the control device 15 advances the processing to the end.

In addition, in step S05, the control device 15 determines that the detection object is not an object present outside the ship 1, and for example, is an object such as a crew on the ship 1, an article loaded on the ship 1, or the like. Then, the control device 15 advances the processing to the end.

For example, like detection regions 50A and 50B of the external sensor 11 when the bow has risen and when the hull is horizontal as shown in FIG. 3, it is determined that a first detection object 20 whose relative position for the ship 1 is invariant is not an object present outside the ship 1 but, for example, an object such as a crew on the ship 1.

Meanwhile, it is determined that a second detection object 30, which is displaced downward relative to the ship 1 when the bow has risen compared to when the hull is horizontal, is an object present outside the ship 1, for example, an obstacle on water such as another ship or the like floating on the water surface in front of the ship 1.

In addition, in step S06 shown in FIG. 2, the control device 15 acquires a state of the attitude change of the ship 1 on the basis of the signal received from the inertia sensor 13, and determines whether the ship is a bow down state in which the bow 1a of the ship 1 is displaced downward due to, for example, pitching or the like.

When the determination result is "YES," the control device 15 advances the processing to step S07. Meanwhile, when the determination result is "NO," the control device 15 advances the processing to the end.

Next, in step S07, the control device 15 acquires a state of the displacement of the detection object on the basis of the signal received from the external sensor 11, and determines whether the detection object in the predetermined detection region of the external sensor 11 is displaced upward relative to the ship 1 due to, for example, pitching or the like of the ship 1.

When the determination result is "YES," the control device 15 advances the processing to step S08. Meanwhile, when the determination result is "NO," the control device 15 advances the processing to step S09.

Next, in step S08, the control device 15 determines that the detection object is an object present outside the ship 1, for example, an object such as an obstacle (obstacle on water) or the like floating on the water surface. Then, the control device 15 advances the processing to the end.

In addition, in step S09, the control device 15 determines that the detection object is not an object present outside the ship 1 but, for example, is an object such as a crew on the ship 1, an article loaded on the ship 1, or the like. Then, the control device 15 advances the processing to the end.

For example, like the detection regions 50B and 50C of the external sensor 11 when hull is horizontal and when the bow is down shown in FIG. 3, it is determined that the first detection object 20 whose relative position for the ship 1 is invariant is not an object present outside the ship 1 but, for example, an object such as a crew or the like on the ship 1.

Meanwhile, it is determined that the second detection object 30, which is displaced upward relative to the ship 1 when the bow is down compared to when the hull is horizontal, is an object present outside the ship 1 and, for example, an obstacle on water such as another ship floating on the water surface in front of the ship 1.

As described above, the object detection device 10 of the embodiment can appropriately discriminate an object mounted on the ship 1 and an object outside the ship 1 by providing the control device 15 configured to determine whether the detection object is present outside the ship 1 according to the correlation between the state of the relative displacement of the detection object and the state of the attitude change of the ship 1.

The object detection device 10 can accurately detect the object outside the ship 1 by providing the control device 15 configured to determine that the detection object is present outside the ship 1 when the correlation between the state of the relative displacement of the detection object and the state of the attitude change of the ship 1 is greater than the predetermined level.

For example, it is possible to determine whether the object detected by the external sensor 11 is present outside the ship 1 with no need to previously set a length from the position of the external sensor 11 to the bow 1a through measurement or the like, minimize the complicated work required for the initial setting, and minimize an increase in costs required for the setting.

Variant

Hereinafter, a variant of the embodiment will be described. Further, the same portions as in the above-mentioned embodiment are designated by the same reference signs and description thereof will be omitted or simplified.

While the external sensor 11 is fixed not to change the relative position and attitude for the ship 1 in the above-mentioned embodiment, there is no limitation thereto. The external sensor 11 may be configured such that at least one of the position and the attitude can be appropriately changed independently from the attitude change of the ship 1.

While the inertia sensor 13 includes the gyro sensor or the acceleration sensor in the above-mentioned embodiment, there is no limitation thereto and another sensor configured to detect information required for acquiring an attitude change of the ship 1 may be provided.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:
1. An object detection device comprising:
   an inertia sensor configured to detect an inertial force applied to a ship and output a signal of a detection value of information related to the inertial force;
   an object sensor fixed to the ship and configured to detect an object and output a signal of a detection value of information related to the object; and
   a processing device configured to acquire a state of an attitude change of the ship on the basis of the signal output from the inertia sensor, acquire a state of relative displacement of the object on the basis of the signal output from the object sensor, and determine whether the object is present outside the ship according to a correlation between the state of the attitude change of the ship and the state of the relative displacement of the object.
2. The object detection device according to claim 1, wherein the processing device determines that the object is present outside the ship when the correlation is greater than a predetermined level.

* * * * *